May 2, 1950     C. W. TINKHAM     2,506,002
STATIC WHEEL BALANCER
Filed April 21, 1947

INVENTOR.
CHARLES W. TINKHAM
BY Howard J. Whelan

Patented May 2, 1950

2,506,002

UNITED STATES PATENT OFFICE 2,506,002

STATIC WHEEL BALANCER

Charles W. Tinkham, Baltimore, Md.

Application April 21, 1947, Serial No. 742,836

2 Claims. (Cl. 73—66)

This invention relates to the balancing of wheels, and those particularly usable on vehicles, where at high speeds, unbalancing would tend to subject them to shimmying and vibrational reactions of a noticeable and undesirable nature. The device more particularly pertains to a machine capable of evaluating the degree of unbalance of a wheel, conveniently and quickly, and enabling adjustments to be made to correct the unbalance as much as necessary or desirable.

In a particular form of balance testing machine for wheels, a tapered carrier is used, subject to rotation, on which the wheel is mounted to be tested, the carrier rotates on a conically pointed spindle in a socket which permits a slight tilt. The tapered holder is arranged to receive different sized holes in the hub portions of wheels, which will take up different positions according to the size of the holes and change of the center-of-gravity plane of the wheel thereon depending on how it is mounted on the holder. Thus a wheel with a large hub hole will position itself lower down on the carrier than one with a smaller hub hole. This results in a different center-of-gravity plane on the testing machine for each different wheel, and therefore changes the test evaluations in several practical ways which the rotation of the wheel accentuates during the test.

In order to overcome this difficulty, this invention has a framework carrier that when used, avoids the need of its rotation, while the center-of-gravity plane is kept at an established level.

It is therefore an object of this invention to provide a new and improved static wheel balancer that will avoid one or more of the disadvantages and limitations of the prior art.

Another object of the invention is to provide a new and improved static wheel balancer that will test a wheel for balance without requiring its rotation, and at the same time will hold the wheel in such a position as to bring its center of gravity plane at a predetermined horizontal level.

A still further object of the invention is to provide a new and improved wheel balancer that will suspend the wheel in a plane aligned with the point of suspension and have a flexible or ball point arrangement on which the suspension rests to enable it to be tilted readily in any direction that the wheel may be unbalanced.

Other objects will be apparent as the details of the invention are further outlined.

For a better understanding of the invention, reference is made to the accompanying drawings, which together with the following description illustrate a particular form of the invention by way of example. The claims point out particularly the scope of the invention.

In the drawings.

Similar parts are designated by similar numerals of reference throughout the different figures.

Figure 1:
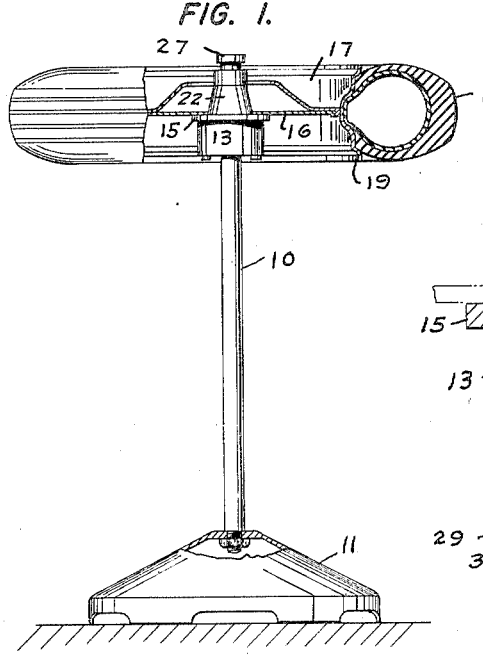
Figure 1 is a side elevation of a static wheel balancer, partly in section to show its internal construction, embodying this invention.

In the particular form shown in the drawings, a spindular vertical support or column 10 has an enlarged circular base 11 at its bottom to keep it erect and its top supporting area formed with a ball 12. A carrier framework consisting of a dish-like member 13 closed in at the bottom plate 29 except where a hollow stem 14 projects a short amount 31 through it at the central portion. A circular flange 15 outwardly extended as a rest plate on which to rest the spoke area 16 of a wheel 17, having a pneumatic tire 18 mounted on its rim 19 in a conventional manner.

Figure 2:
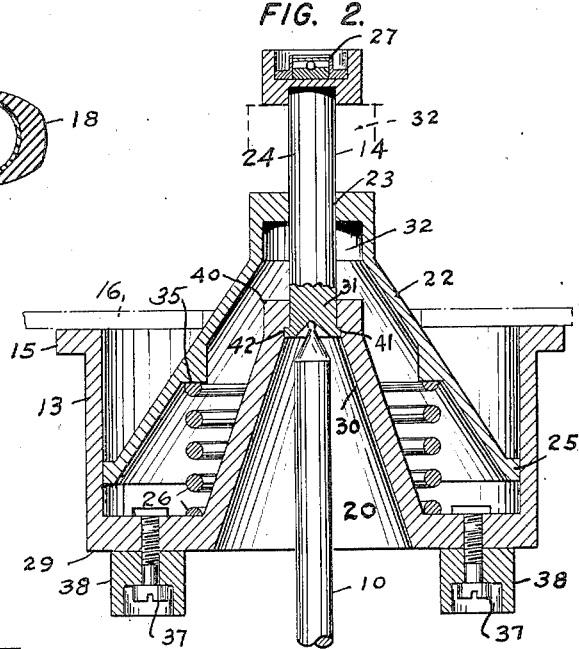
Figure 2 is an enlarged sectional view of the balancer shown in Figure 1.
Figure 3:
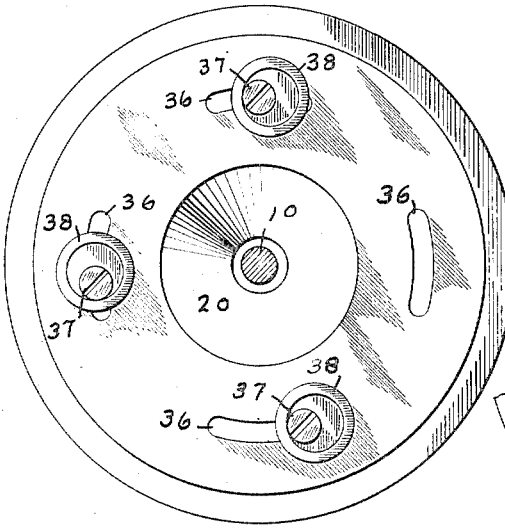
Figure 3 is a plan view of the under portion of Figure 1.
Figure 4:
Figure 4 is an enlarged view showing the quasi-spherical recess in the stem bearing on the ball end of the column.
Figure 5:
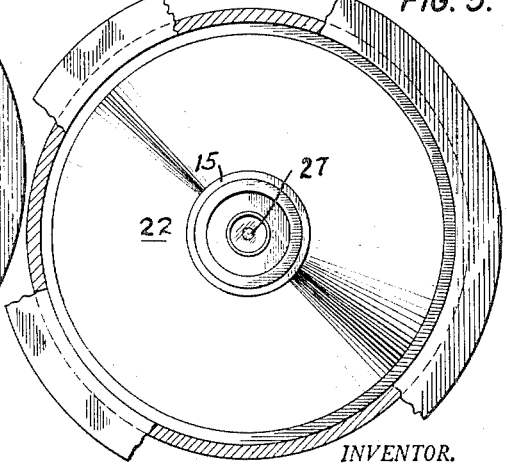
Figure 5 is a plan view of Figure 1 with parts in section.

The member 13 is hollowed out at its central portion 20 into the lower section, with its upper portion 30 tapering upwardly and inwardly and terminating at the bottom of the stem 14 to which it is attached. Stem 14 is provided at its lower end with a quasi-spherical recess 21, engaging the ball 12. This ball 12 and spherical recess 21 produce an arrangement that enables the stem 14 to tilt over to any angle from the vertical in any direction until the portion 21 of the stem 14 is contacted laterally. The stem 14 extends upwardly above the level of the framework carrier member 13 to allow for an upwardly slanting adjuster 22 of conical contour with a central opening 23 at its apex portion 32 to slide up and down its exterior surface 24. The adjuster fits and rests on the cap 40 provided on the portion 30, of the member 13. A cylindrical rim 25 serves as a skirt and a guide for the adjuster 22 in the member 13 to retain it in the same relative position with regard to the stem 14 during the travel of this adjuster 22 up and down. A spring 26 of the coil type is held inside the member 13 and raises or pushes the adjuster 22 upwardly when the wheel 17 to be tested is not placed on it. The top of the stem 14 is surmounted by a circular spirit level instrument 27 with a bubble used for indicating the balance or unbalance in the wheel 17 in any direction, depending on the tilt given to the stem 14. The bottom of the stem 14 has a flange 41 that fits in a recess 42 in the member portion 30. It can be observed, that the spoke area 16 of the wheel 17 is supported on the flange 15 and stays there at all times during testing. However to retain the wheel 17 against lateral movements, the hub opening in the wheel is aligned over the conical surface of the adjuster 22 until it fits closely thereon. This does not change the position of the center-of-gravity plane of the wheel, which is in the spoke section thereof. The dotted outline of the adjuster 22 shows the limit of its vertical travel upwardly, where it will normally be when a wheel is not resting on the device, because the coil spring 26 raises it to that point by reason of its natural resiliency due to its formation. The spring 26 is so arranged within the conical space under the adjuster 22 that its upper portion makes contact with a lug 35 on the underside as indicated in Figure 2. The lug 35 is located about the middle portion of the adjuster adjacent the center-of-gravity plane of the piece. The member 13 is provided with a number of elongated slots 36 which are adapted to receive stud bolts 37 and specially formed circular weights 38. These weights are added to the member 13 to counteract any unbalance that may exist in the member. After the member is balanced, the wheel is positioned on the member to determine what adjustments in weight should be made in the wheel. These adjustments are made by the attachment of counterbalance weights to the rim of the wheel. The position of the carrier member 13 and its adjuster 22 on the tip of the column is somewhat flexible, or at least so that any variation in the balance of the parts will be free to show it quickly and conspicuously. With the wheel 17 in place on the adjuster 22 acting on it resiliently and unbalanced at one point, it will induce the stem 14 to tilt in that direction. The level instrument 27 will then indicate the fact because it will be tilted likewise. The operator will usually adjust the unbalance of the wheel by attaching weights thereof for counterweighting the unbalance. This is kept on, changed or added to as the unbalance may require, and until the wheel is balanced. The wheel is then lifted off the device and assembled on the vehicle it is to be used with. During all the tests the wheel is kept stationary. The ball 12 enables it to tilt easily in any direction due to unbalance. The coil spring 23, not only serves to control the adjuster but also acts as a cushion for the wheel when mounted on the device.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. A wheel balancer comprising a base, a column secured thereto and projecting upwardly therefrom, said column terminating in a ball point, a stem having a conical recess at its lower end engaging said ball point, said stem being tiltable about said ball point, a circular flange at the lower end of said stem, a dish-shaped carrier member having an outer cylindrical wall, a crown-shaped bottom plate extending inwardly from said cylindrical wall and extending upwardly within said carrier in truncated-cone formation terminating in a hollow cap resting upon and carried by the aforesaid circular flange at the lower end of said stem, an adjuster member having a lower circular flange guided within said dish-shaped carrier, said adjuster member having conical walls extending upwardly from said circular flange towards said stem and terminating in a horizontal disk portion having an axial opening for the free passage of said stem therethrough, a circular abutment carried internally by the walls of said adjuster member, a helical coil between said circular abutment and said aforementioned crown-shaped bottom plate, and a flange on the upper end of said cylindrical wall for supporting a wheel to be balanced.

2. A wheel balancer as set forth in claim 1, including adjustable means secured to said crown-shaped bottom plate, and a levelling indicator carried at the upper end of said stem.

CHARLES W. TINKHAM.

REFERENCES CITED

The following references are of record in the file of this patent:

UNITED STATES PATENTS

| Number | Name | Date |
|---|---|---|
| 8,538 | Todd | Nov. 18, 1851 |
| 189,506 | Seymour | Apr. 10, 1877 |
| 2,060,958 | Taylor | Nov. 17, 1936 |
| 2,075,421 | Bennett | Mar. 30, 1937 |
| 2,136,633 | Morse | Nov. 15, 1938 |
| 2,199,667 | Lannen | May 7, 1940 |
| 2,233,371 | Smith | Feb. 25, 1941 |
| 2,298,656 | Smith | Oct. 13, 1942 |